US010247098B2

(12) United States Patent
Lyons

(10) Patent No.: US 10,247,098 B2
(45) Date of Patent: Apr. 2, 2019

(54) DIFFUSER CASE STRUT FOR A TURBINE ENGINE

(71) Applicant: United Technologies Corporation, Hartford, CT (US)

(72) Inventor: Christopher B. Lyons, West Hartford, CT (US)

(73) Assignee: United Technologies Corporation, Farmington, CT (US)

(*) Notice: Subject to any disclaimer, the term of this patent is extended or adjusted under 35 U.S.C. 154(b) by 593 days.

(21) Appl. No.: 14/890,188

(22) PCT Filed: May 8, 2014

(86) PCT No.: PCT/US2014/037231
§ 371 (c)(1),
(2) Date: Nov. 10, 2015

(87) PCT Pub. No.: WO2015/017000
PCT Pub. Date: Feb. 5, 2015

(65) Prior Publication Data
US 2016/0090914 A1 Mar. 31, 2016

Related U.S. Application Data

(60) Provisional application No. 61/821,924, filed on May 10, 2013.

(51) Int. Cl.
F02C 7/18 (2006.01)
F01D 25/08 (2006.01)
(Continued)

(52) U.S. Cl.
CPC .................. F02C 7/18 (2013.01); F01D 5/02 (2013.01); F01D 9/02 (2013.01); F01D 9/065 (2013.01);
(Continued)

(58) Field of Classification Search
CPC .......... F01D 9/065; F01D 5/081; F01D 5/082; F01D 11/24; F02C 7/185
(Continued)

(56) References Cited

U.S. PATENT DOCUMENTS 5,297,386 A 3/1994 Kervistin
5,581,996 A 12/1996 Koch et al.
(Continued)

OTHER PUBLICATIONS

Supplementary European Search Report for Application No. 14832432.0 dated Dec. 6, 2016.
(Continued)

Primary Examiner — Justin D Seabe
Assistant Examiner — Behnoush Haghighian
(74) Attorney, Agent, or Firm — Carlson, Gaskey & Olds, P.C.

(57) ABSTRACT

An inner diffuser case for a turbine engine includes a fore gas path edge and an aft gas path edge defining a strut, wherein each of the fore gas path edge and the aft gas path edge include a gas path opening, a support cone structure extending radially outward from the strut, wherein the support cone structure is operable to structurally connect the strut to a turbine engine case, a diffuser case skirt structure extending radially inward from the strut, wherein the diffuser case skirt structure is operable to structurally connect the diffuser case strut to an inner support structure of the turbine engine, and at least one direct feed air passage passing radially through the strut including a radially outward upper mixing chamber opening and a radially inward direct air feed opening, the direct air feed opening is connected to a direct air feed.

14 Claims, 4 Drawing Sheets

(51) Int. Cl.
*F02C 7/12* (2006.01)
*F01D 25/16* (2006.01)
*F01D 9/06* (2006.01)
*F01D 5/02* (2006.01)
*F01D 9/02* (2006.01)
*F01D 25/12* (2006.01)
*F01D 25/24* (2006.01)
*F02C 3/06* (2006.01)
*F02C 7/04* (2006.01)

(52) U.S. Cl.
CPC .............. *F01D 25/08* (2013.01); *F01D 25/12* (2013.01); *F01D 25/162* (2013.01); *F01D 25/24* (2013.01); *F02C 3/06* (2013.01); *F02C 7/04* (2013.01); *F02C 7/12* (2013.01); *F02C 7/185* (2013.01); *F05D 2210/12* (2013.01); *F05D 2220/32* (2013.01); *F05D 2220/3219* (2013.01); *F05D 2240/12* (2013.01); *F05D 2240/35* (2013.01); *F05D 2260/211* (2013.01); *F05D 2260/213* (2013.01); *Y02T 50/676* (2013.01)

(58) Field of Classification Search
USPC .................................................. 415/115, 116
See application file for complete search history.

(56) References Cited

U.S. PATENT DOCUMENTS

| | | |
|---|---|---|
| 5,924,843 A | 7/1999 | Staub et al. |
| 6,179,555 B1 | 1/2001 | Tremaine |
| 6,382,914 B1 | 5/2002 | Tressler |
| 6,468,032 B2 | 10/2002 | Patel |
| 6,672,072 B1 * | 1/2004 | Giffin, III ................ F01D 5/08 60/728 |
| 6,735,956 B2 | 5/2004 | Romani |
| 6,974,306 B2 | 12/2005 | Djeridane et al. |
| 7,000,404 B2 * | 2/2006 | Palmisano .............. F01D 25/12 60/728 |
| 8,277,169 B2 | 10/2012 | Riahi et al. |
| 8,869,538 B2 * | 10/2014 | Nanda .................... F01D 25/14 60/785 |
| 2005/0022535 A1 | 2/2005 | Palmisano et al. |
| 2010/0074736 A1 | 3/2010 | Junod |
| 2011/0088405 A1 | 4/2011 | Turco |
| 2012/0159958 A1 | 6/2012 | Nanda et al. |

OTHER PUBLICATIONS

The International Preliminary Report on Patentability for PCT Application No. PCT/US2014/037231, dated Nov. 19, 2015.
International Search Report and Written Opinion for PCT Application No. PCT/US2014/037231, dated Feb. 17, 2015.

* cited by examiner

DIFFUSER CASE STRUT FOR A TURBINE ENGINE

STATEMENT REGARDING FEDERALLY SPONSORED RESEARCH OR DEVELOPMENT

This invention was made with government support under Contract No. FA8650-09-D-2923 awarded by the United States Air Force. The Government has certain rights in this invention.

TECHNICAL FIELD

The present disclosure relates generally to turbine engine structures, and more specifically to a diffuser case strut for a turbine engine.

BACKGROUND OF THE INVENTION

Gas turbine engines are known and when used on aircraft typically include a fan delivering air into a bypass duct and into a compressor section. Air from the compressor is passed downstream into a combustion section where it is mixed with fuel and ignited. Products of this combustion pass downstream over turbine rotors driving them to rotate.

Turbine rotors drive compressor and fan rotors. Historically, the fan rotor was driven at the same speed as a turbine rotor. More recently, it has been proposed to include a gear reduction between the fan rotor and a fan drive turbine. With this change, the diameter of the fan has increased dramatically and a bypass ratio or volume of air delivered into the bypass duct compared to a volume delivered into the compressor has increased. With this increase in bypass ratio, it becomes more important to efficiently utilize the air that is delivered into the compressor.

One factor that increases the efficiency of the use of this air is to have a higher pressure at the exit of a high pressure compressor. This high pressure results in a high temperature increase. The temperature at the exit of the high pressure compressor is known as $T_3$ in the art.

Due to the increased $T_3$ temperature, the last stage (the aft most stage) of a high pressure compressor in the turbine engine, as well as the compressor rotor rim, can experience temperatures beyond the typical temperature capabilities of the compressor stages and the compressor rotor rim. The additional heat experienced can cause a decrease in the lifespan of compressor components such as the last stages of the compressor.

To address this $T_3$ systems utilize a compressor on-board injection (COBI) system that receives cooled air from a heat exchanger in a cooled air system and uses the cooled air to cool the last stage of the compressor and the compressor rotor rim. Known cooled air systems include air losses due to circuitous flow routes and complex mixing between the heat exchanger and the compressor on-board injection (COBI) system.

SUMMARY OF THE INVENTION

A turbine engine according to an exemplary embodiment of this disclosure among other possible things includes, a compressor section having a first compressor portion and a second compressor portion, wherein the second compressor portion is a high pressure compressor relative to the first compressor portion, a combustor in fluid communication with the compressor section, a turbine section in fluid communication with the combustor, a gas path passing through each of the compressor section, the combustor, and the turbine section, the second compressor portion further including an exit guide vane at an aftmost edge, relative to gas flow through the gas path, of the second compressor portion, and an inner diffuser case including a diffuser case strut positioned in the gas path aft of the exit guide vane, wherein the diffuser case strut includes at least a first direct feed passage connected on a first end to a cooled air system and on a second end to a direct air feed, wherein the direct air feed delivers air to at least one of a compressor rim and an aftmost compressor stage of the second compressor portion.

In a further embodiment of the foregoing system, the diffuser case strut further includes a second direct feed passage including a first end opening to the cooled air system and a second end opening to a tangential onboard injection (TOBI) system.

In a further embodiment of the foregoing system, the diffuser case strut further includes a cavity intersecting with the direct feed air passage, such that airflow through the direct feed air passage passes through the cavity.

In a further embodiment of the foregoing system, the cavity is arranged such that air flowing through the cavity is conditioned prior to exiting the direct feed air passage.

In a further embodiment of the foregoing system, the direct air feed delivers air to at least one of a compressor hub, spacer arm and an aftmost compressor stage of the second compressor portion via a compressor on board injection (COBI) system.

In a further embodiment of the foregoing system, the direct air feed delivers air directly to at least one of a compressor hub, spacer arm and an aftmost compressor stage of the second compressor portion.

In a further embodiment of the foregoing system, the diffuser case strut is integral to the diffuser case and wherein the diffuser case strut is connected to the high pressure compressor via a support cone and to the turbine section via an inner case skirt.

In a further embodiment of the foregoing system, the turbine engine further includes a conditioned air space fore of the inner diffuser case, the conditioned air space connected to the direct feed air passage via an opening in the direct feed air passage, and wherein the conditioned air space receives air from the heat exchanger.

In a further embodiment of the foregoing system, the diffuser case strut is immediately aft of the exit guide vane in the gas path.

A method for providing cooling air to at least an aftmost stage of a high pressure compressor in a turbine engine according to an exemplary embodiment of this disclosure among other possible things includes the step of passing cooling air from an upper mixing chamber to an air feed through a direct feed passage in a diffuser strut.

In a further embodiment of the foregoing method, the step of passing cooling air from an upper mixing chamber to a direct air feed through a direct feed passage in a diffuser strut further comprises passing the cooling air to a compressor on board injection (COBI), thereby allowing the COBI system to cool the aftmost compressor stage.

An inner diffuser case for a turbine engine according to an exemplary embodiment of this disclosure among other possible things includes a fore gas path edge and an aft gas path edge defining a strut, wherein each of the fore gas path edge and the aft gas path edge include a gas path opening, a support cone structure extending radially outward from the strut, wherein the support cone structure is operable to structurally connect the strut to a turbine engine case, a diffuser case skirt structure extending radially inward from the strut, wherein the diffuser case skirt structure is operable to structurally connect the diffuser case strut to an inner support structure of the turbine engine, and at least one direct feed air passage passing radially through the strut including a radially outward upper mixing chamber opening and a radially inward direct air feed opening, the direct air feed opening is connected to a direct air feed.

In a further embodiment of the foregoing system, the direct air feed is a direct air feed passage for a compressor on-board injection (COBI) system.

In a further embodiment of the foregoing system, the inner diffuser case further includes a second direct feed air passage passing radially through the strut, wherein the second direct feed air passage includes a radially outward upper mixing chamber opening and a radially inward tangential on-board injection (TOBI) passage opening.

In a further embodiment of the foregoing system, the upper mixing chamber opening is aft of the diffuser case skirt structure, relative to the gas path, and wherein the direct feed air passage includes a conditioned air opening fore of the diffuser case skirt on a radially outward edge of the strut, such that the direct feed air passage can receive conditioned air from a hot air injection system.

In a further embodiment of the foregoing system, the inner diffuser case further includes a cavity defined in the strut, the cavity intersecting the direct feed air passage thereby causing a flow path through the direct feed air passage to pass through the cavity.

These and other features of the present invention can be best understood from the following specification and drawings, the following of which is a brief description.

DETAILED DESCRIPTION OF AN EMBODIMENT

Figure 1:
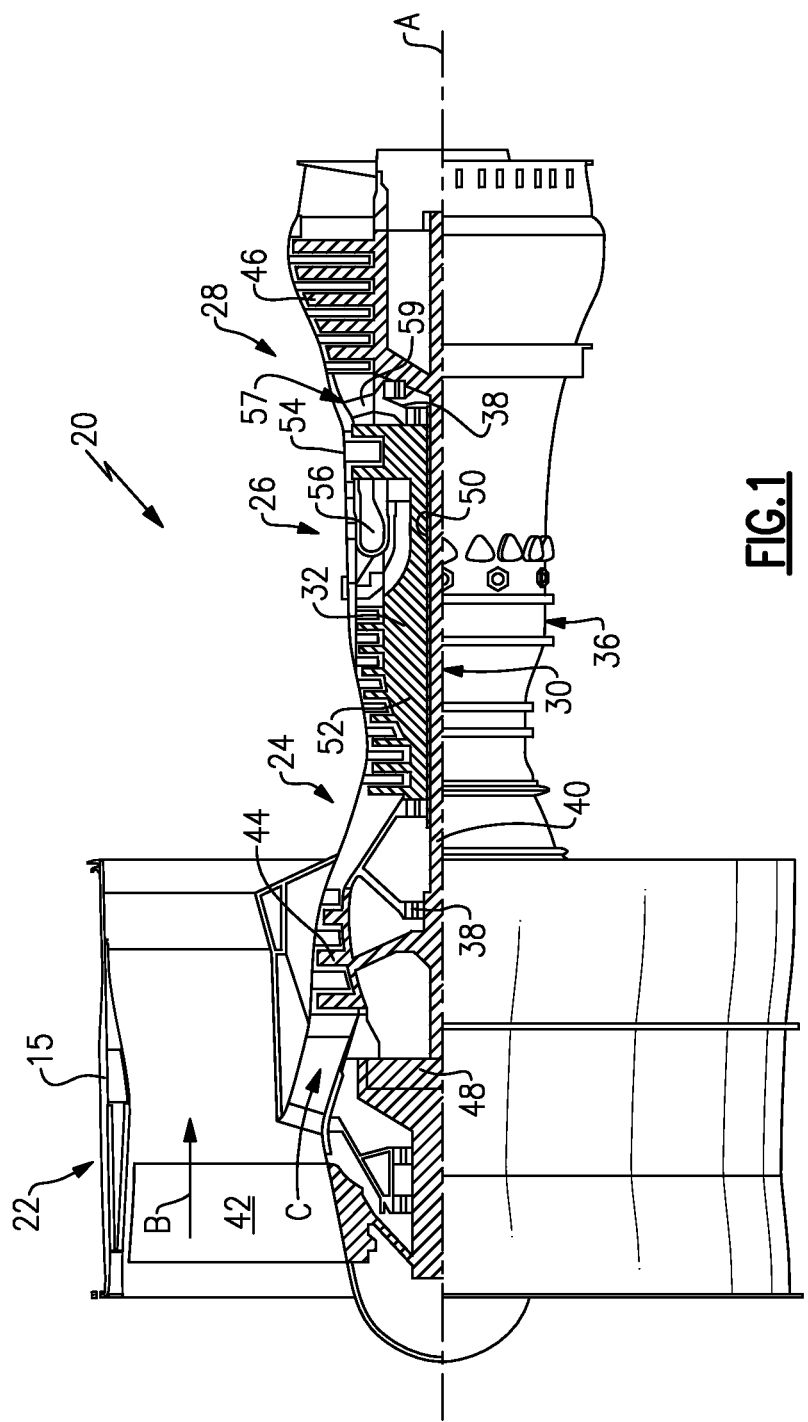
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about five (5). In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } °\text{R})/(518.7° \text{R})]^{0.5}$. The "Low corrected fan tip speed" as disclosed herein according to one non-limiting embodiment is less than about 1150 ft/second.

Figure 2:
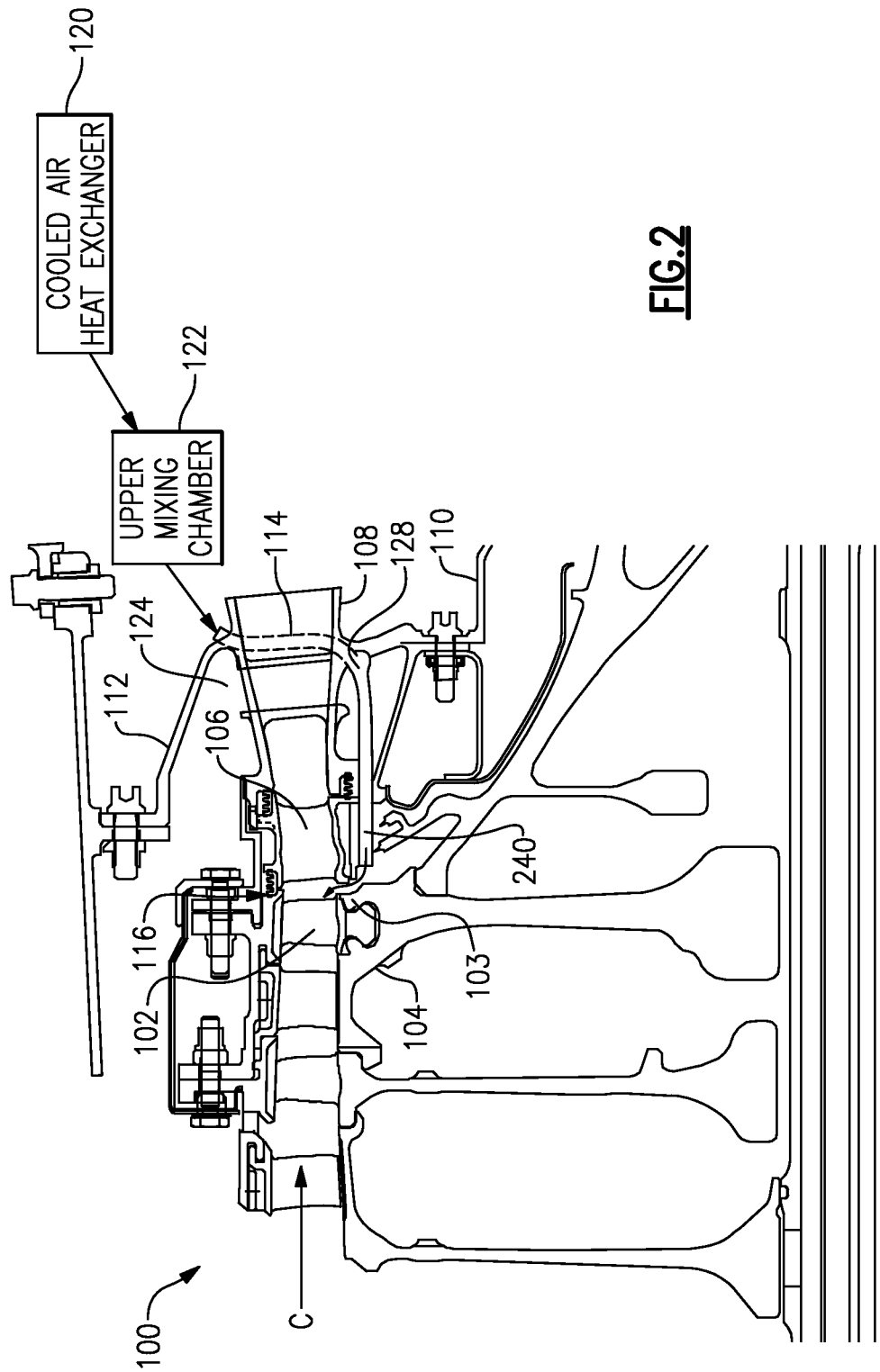
FIG. 2 schematically illustrates a high pressure compressor section within a gas turbine engine.

FIG. 2 illustrates a sectional view 100 of the turbine engine 20 of FIG. 1, illustrating a high pressure compressor portion 102. The compressor portion 102 includes rotor blades 103 connected to rotor disks 104. An exit guide vane 106 is positioned within the gas flow path C immediately aft of the compressor portion 102 and alters flow characteristics of a gas flow exiting the compressor portion 102, prior to the gas flow entering a combustor 56 (illustrated in FIG. 1).

Immediately aft of the exit guide vane 106 and positioned in the gas flow path C is an inner diffuser case 108 that mechanically supports the structures of the turbine engine 20. The inner diffuser case 108 is connected on a radially interior edge to a turbine engine support structure via an inner skirt 110 and is connected to a turbine engine case structure on a radially outer edge via a support cone 112. Integrally connected with the inner diffuser case 108 is an inner diffuser case strut 109. The inner diffuser case strut 109 further includes a flow path opening aligned with the gas flow path C, thereby allowing gasses in the flow path C to pass through the inner diffuser case strut 109.

Immediately superior of the support cone 112 is an upper mixing chamber 122. The upper mixing chamber 122 receives cooled air from a cooled air heat exchanger 120, and allows the cooled air to mix with ambient air to a desired temperature. The upper mixing chamber 122 and the cooled air heat exchanger 120 are collectively referred to as a cooled air system. Within the inner diffuser case strut 109 is a direct feed passage 114 with a first opening into the upper mixing chamber 122, and a second opening into a direct air feed 128 located radially inward of the inner diffuser case 108. The direct feed passage 114 provides a direct air route from the upper mixing chamber 122 to the direct air feed 128, thereby avoiding system losses associated with individual tubes, circuitous flow routes, complex mixing as well as other potential air delivery systems.

In one example, the direct air feed 128 in turn delivers the air directly to the compressor hub and spacer arm as well as a rotor blade attachment 103 of the compressor, thereby directly cooling the compressor hub, spacer and rotor blade attachment 103. In an alternate example, the direct air feed 128 delivers the cooled air directly to a compressor on board injection (COBI) system 240 that provides cooling to the spacer arm, rotor blade attachment 103 and compressor hub. In both of the examples, the system is characterized as delivering the air directly from the upper mixing chamber 122 to the compressor hub, spacer and rotor blade attachment 103 through the direct feed passage 114.

As a result of the above described $T_3$ temperatures, the gas exiting the compressor portion 102 is at an extremely high temperature, and subjects the aftmost rotor blade attachment 103 and the compressor hub to temperatures elevated beyond the standard temperature capabilities of the respective parts. By providing a direct air feed to the rotor blade's attachment 103, the spacer arm, and the compressor hub additional cooling is provided, thereby allowing the $T_3$ temperatures to be utilized.

Immediately fore of the support cone 112 is a dead space 124. The dead space 124 in some examples is a void. In alternate examples, as described below, the dead space 124 can be utilized to provide additional mixing and heat conditioning of the air being provided to the direct air feed 128.

Figure 3:
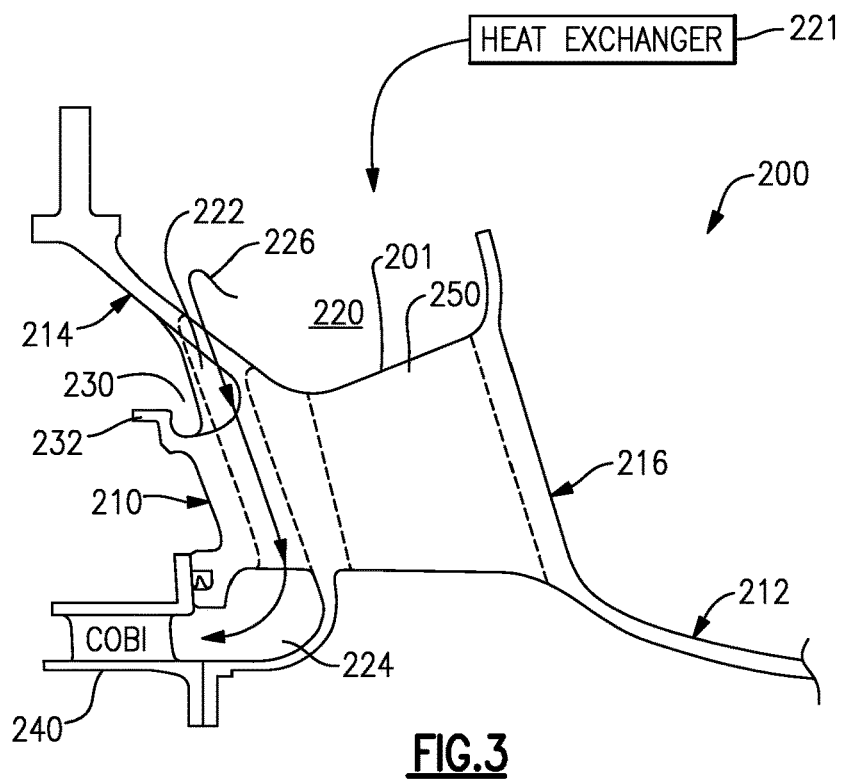
FIG. 3 illustrates a first example diffuser case strut aft of the high pressure compressor section of FIG. 2.

FIG. 3 illustrates a first example inner diffuser case 200 in greater detail. As described and illustrated with regards to FIG. 2, the inner diffuser case 200 includes an inner diffuser case strut 201 having fore edge 210 and an aft edge 216. An inner skirt 212 connects the diffuser strut 201 to a radially inner support structure of the turbine engine 20. Similarly, a support cone 214 structure connects the inner diffuser case strut 201 to the turbine engine case. An upper mixing chamber 220 is defined radially outward of the inner diffuser case 200 and receives cooled air from a heat exchanger 221 located elsewhere in the turbine engine 20.

The inner diffuser case strut 201 includes two direct feed passages 222, 250. The first direct feed passage 222 accepts air from the upper mixing chamber 220, and passes the air directly through the inner diffuser case strut 201 to a direct air feed 224. The direct air feed 224, in turn, passes the air directly to a compressor on board injection (COBI) system 240 along an airflow path 226. The compressor on board injection (COBI) system 240 utilizes the cooled air to cool the compressor rim and the aftmost compressor rotor. The second direct feed passage 250, provides air from the upper mixing chamber 220 directly to a tangential on board injection (TOBI) system 240, which utilizes the direct fed air in a known manner.

The inner diffuser case 200 also includes a fore flange 232 for further connecting the inner diffuser case 200 to the turbine engine structure. Defined between the fore flange 232 and the support cone 214 is a dead space 230. In the illustrated example of FIG. 3, the dead space 230 is not utilized.

Figure 4:
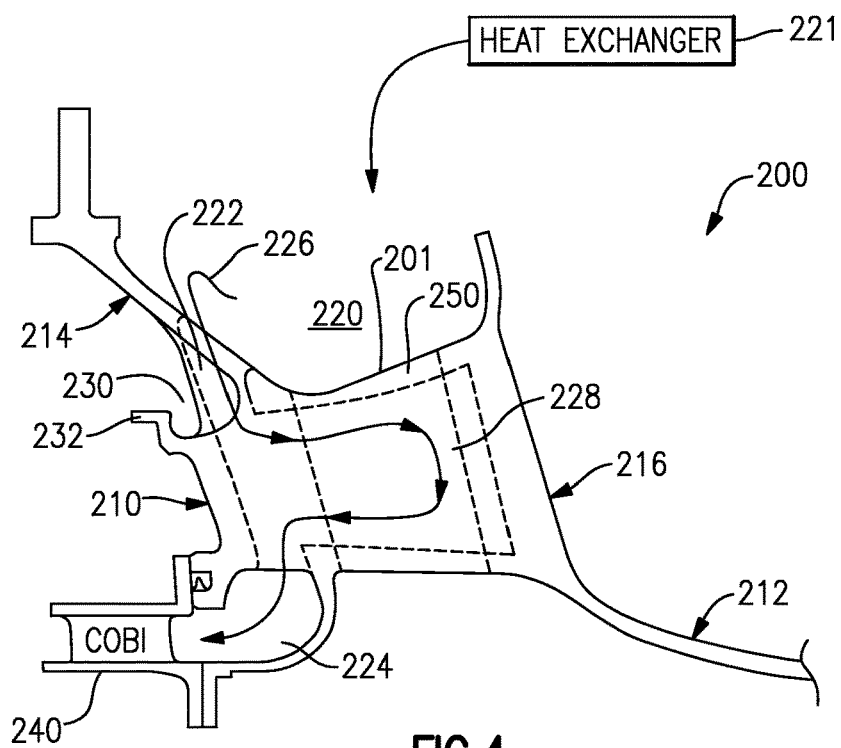
FIG. 4 illustrates a second example diffuser case strut aft of the high pressure compressor section of FIG. 2.

With continued reference to FIG. 3, and with like numerals indicating like elements, FIG. 4 illustrates a second example inner diffuser case 200 aft of the high pressure compressor section of FIG. 2. The second example inner diffuser case strut 201 includes an additional cavity 228 connected to the direct feed passage 222. As air is passed through the direct feed passage 222, the air enters the cavity 228. Air passing through the cavity 228 follows the air flow path 226. As a result of the additional length of the flow path 226, due to the air passing through the cavity 228, the cooled air is further conditioned and is brought to a desirable temperature prior to being fed to the compressor rim or the compressor on board injection (COBI) system 240. With the exception of the additional cavity 228, the second example inner diffuser case 200 operates similarly to the first example, illustrated in FIG. 3.

Figure 5:
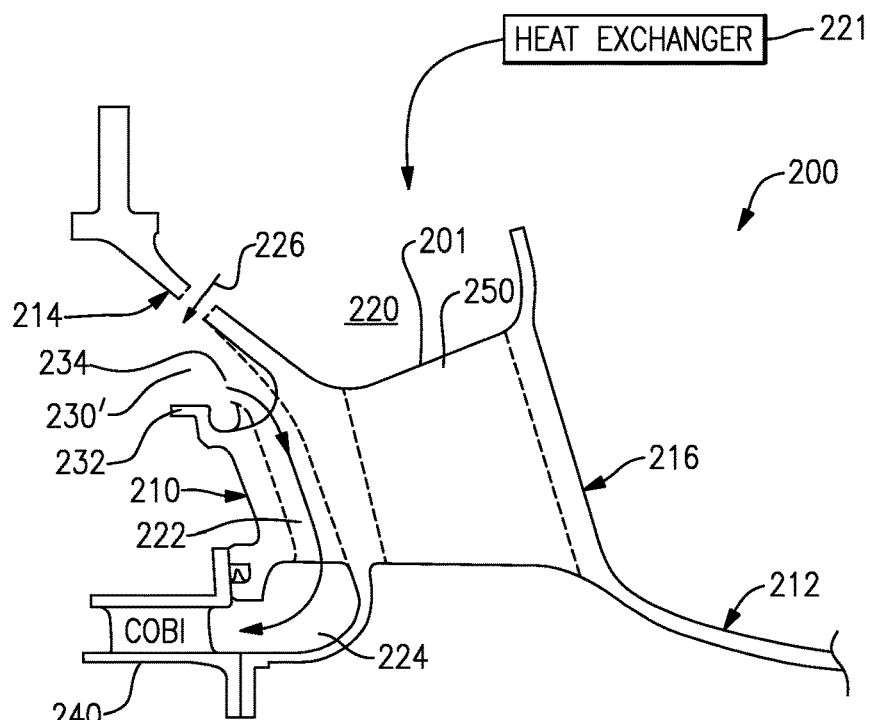
FIG. 5 illustrates a third example diffuser case strut aft of the high pressure compressor section of FIG. 2.

With continued reference to FIG. 3, and with like numerals indicating like elements, FIG. 5 illustrates a third example inner diffuser case 200. In the third example inner diffuser case 200, the dead space 230 is replaced with a conditioned air space 230'. The conditioned air space 230' provides a conditioning air flow to the direct feed passage 222, and receives air from the heat exchanger 221. In the illustrated example of FIG. 5, the air from the heat exchanger is further conditioned in the conditioned air space 230' prior to being passed into the direct feed passage 222.

In some example implementations the cooled air from the upper mixing chamber 220 is too cold to be effectively utilized by the compressor on board injection (COBI) system 240. To address this limitation, air from the heat exchanger 221 is passed into the conditioned air space 230', and an additional opening 234 connects the conditioned air space 230' to the direct feed passage 222, resulting in the illustrated direct feed air flow path 226. This configuration utilizes the conditioned air space 230' to increase the exposed surface area of the flowpath and to increase the total flow time of air passing through the flowpath from the heat exchanger 221 to the direct feed passage 222. By increasing these factors, the temperature of the air flowing through the flowpath is increased prior to the air entering the direct feed passge 222.

Figure 6:
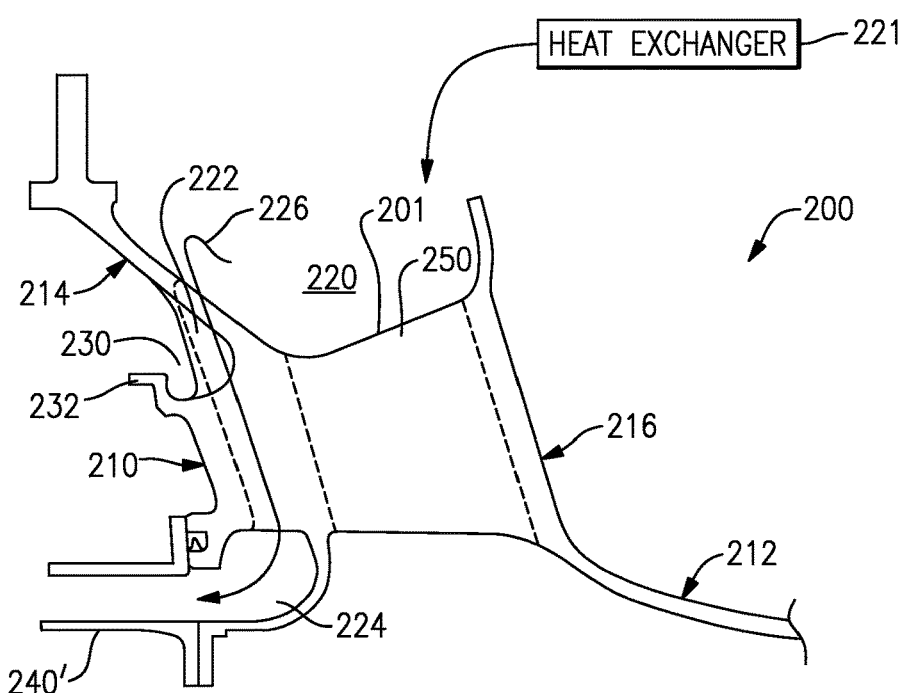
FIG. 6 illustrates a fourth example diffuser case strut aft of the high pressure compressor section of FIG. 2.

With continued reference to FIG. 3, and with like numerals indicating like elements, FIG. 6 illustrates a fourth example diffuser case strut aft of the high pressure compressor section of FIG. 2. The example inner diffuser case 200 of FIG. 6 is identical to the diffuser case strut of FIG. 3, with the exception of the direct air feed. In the example of FIG. 6, the direct air feed 224 provides the cooled air from the upper mixing chamber 220 directly to the aftmost rotor blade 103 and the compressor rim (illustrated in FIG. 2) through an extended direct air feed passage 240'. The example of FIG. 6 omits the compressor on board injection (COBI) system.

While each of the above example diffuser struts 200 is illustrated independently, and described as a separate example, it is understood that the illustrated features can be utilized alone or in any combination. Thus, the single feature examples of FIGS. 3-6 are for illustrative purposes only, and practical implementations can utilize two or more of the described features.

It is further understood that the above listed examples combined with alterations to the upper mixing chamber 220 and/or the heat exchanger 221 can be tailored to provide specific requirements and temperatures, and the air flow through the direct feed passage 222 can be controlled independent of airflow through adjacent passages or through the central gas flowpath.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A turbine engine comprising:
   a compressor section having a first compressor portion and a second compressor portion, wherein the second compressor portion is a high pressure compressor relative to the first compressor portion;
   a combustor in fluid communication with the compressor section;
   a turbine section in fluid communication with the combustor;
   a gas path passing through each of said compressor section, said combustor, and said turbine section;
   the second compressor portion further including an exit guide vane at an aftmost edge, relative to gas flow through the gas path, of the second compressor portion; and an inner diffuser case including a diffuser case strut positioned in said gas path aft of said exit guide vane and fore of said combustor, wherein said diffuser case strut includes at least a first direct feed passage connected on a first end to a cooled air system and on a second end to a direct air feed, wherein said direct air feed delivers air to at least one of a compressor rim and an aftmost compressor stage of said second compressor portion and a second direct feed passage including a first end opening to the cooled air system and a second end opening to a tangential onboard injection (TOBI) system.

2. The turbine engine of claim 1, wherein said diffuser case strut further comprises a cavity intersecting with said direct feed air passage, such that airflow through said direct feed air passage passes through said cavity.

3. The turbine engine of claim 2, wherein said cavity is arranged such that air flowing through said cavity is conditioned within said cavity and prior to exiting said direct feed air passage.

4. The turbine engine of claim 1, wherein said direct air feed delivers air to at least one of a compressor hub, spacer arm and an aftmost compressor stage of said second compressor portion via a compressor on board injection (COBI) system.

5. The turbine engine of claim 1, wherein said direct air feed delivers air directly to at least one of a compressor hub, spacer arm and an aftmost compressor stage of said second compressor portion.

6. The turbine engine of claim 1, wherein said diffuser case strut is integral to said diffuser case and wherein said diffuser case strut is connected to said high pressure compressor via a support cone and to said turbine section via an inner case skirt.

7. The turbine engine of claim 6, further comprising an air space fore of said inner diffuser case, said air space connected to said direct feed air passage via an opening in said direct feed air passage, and wherein said air space receives air from a heat exchanger.

8. The turbine engine of claim 1, wherein said diffuser case strut is immediately aft of the exit guide vane in said gas path.

9. A method for providing cooling air to at least an aftmost stage of a high pressure compressor in a turbine engine comprising the step of:
   passing cooling air from an upper mixing chamber to an air feed through a direct feed passage in a diffuser strut and passing cooling air through a second direct feed passage in the diffuser strut, the second direct feed passage including a first end opening to the cooled air system and a second end opening to a tangential onboard injection (TOBI) system.

10. The method of claim 9, wherein said step of passing cooling air from an upper mixing chamber to a direct air feed through a direct feed passage in a diffuser strut further comprises passing the cooling air to a compressor on board injection (COBI), thereby allowing the COBI system to cool the aftmost compressor stage.

11. An inner diffuser case for a turbine engine comprising:
   a fore gas path edge and an aft gas path edge defining a strut, wherein each of said fore gas path edge and said aft gas path edge include a gas path opening;
   a support cone structure extending radially outward from said strut, wherein said support cone structure is operable to structurally connect the strut to a turbine engine case;
   a diffuser case skirt structure extending radially inward from said strut, wherein said diffuser case skirt structure is operable to structurally connect the diffuser case strut to an inner support structure of said turbine engine; and
   at least one direct feed air passage passing radially through said strut including a radially outward upper mixing chamber opening and a radially inward direct air feed opening, said direct air feed opening is connected to a direct air feed, wherein said upper mixing chamber opening is aft of said diffuser case skirt structure, relative to said gas path, and wherein the direct feed air passage includes an air opening fore of said diffuser case skirt on a radially outward edge of said strut, such that said direct feed air passage can receive air from a hot air injection system.

12. An inner diffuser case for a turbine engine comprising:

a fore gas path edge and an aft gas path edge defining a strut, wherein each of said fore gas path edge and said aft gas path edge include a gas path opening;

a support cone structure extending radially outward from said strut, wherein said support cone structure is operable to structurally connect the strut to a turbine engine case;

a diffuser case skirt structure extending radially inward from said strut, wherein said diffuser case skirt structure is operable to structurally connect the diffuser case strut to an inner support structure of said turbine engine; and at least one direct feed air passage passing radially through said strut including a radially outward upper mixing chamber opening and a radially inward direct air feed opening, said direct air feed opening is connected to a direct air feed and a second direct feed air passage passing radially through said strut, wherein said second direct feed air passage includes a radially outward upper mixing chamber opening and a radially inward tangential on-board injection (TOBI) passage opening.

13. The inner diffuser case of claim 12, wherein said direct air feed is a direct air feed passage for a compressor on-board injection (COBI) system.

14. The inner diffuser case of claim 12, further comprising a cavity defined in said strut, said cavity intersecting said direct feed air passage thereby causing a flow path through said direct feed air passage to pass through said cavity.

* * * * *